US009951758B2

(12) United States Patent
Buttolph

(10) Patent No.: US 9,951,758 B2
(45) Date of Patent: Apr. 24, 2018

(54) ROTATIONAL ACTUATORS

(71) Applicant: Simmonds Precision Products, Inc., Vergennes, VT (US)

(72) Inventor: Martin E. Buttolph, Middlebury, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 15/419,100

(22) Filed: Jan. 30, 2017

(65) Prior Publication Data

US 2017/0138354 A1 May 18, 2017

Related U.S. Application Data

(63) Continuation of application No. 13/922,576, filed on Jun. 20, 2013, now Pat. No. 9,556,858.

(51) Int. Cl.
*F03G 7/06* (2006.01)

(52) U.S. Cl.
CPC .................... *F03G 7/065* (2013.01)

(58) Field of Classification Search
CPC .................... F03G 7/06; F03G 7/065
USPC .................................... 60/527–529
See application file for complete search history.

(56) References Cited

U.S. PATENT DOCUMENTS

| 4,761,955 | A | 8/1988 | Bloch | |
|---|---|---|---|---|
| 2007/0204613 | A1* | 9/2007 | Alacqua | E05B 47/0009 60/527 |
| 2011/0131971 | A1* | 6/2011 | Walls-Bruck | F03G 7/065 60/527 |
| 2013/0067908 | A1* | 3/2013 | Pittaccio | F03G 7/065 60/528 |

FOREIGN PATENT DOCUMENTS

| EP | 0574022 A2 | 12/1993 | | |
|---|---|---|---|---|
| EP | 2333334 A2 | 6/2011 | | |
| FR | 3050488 A1 | * 10/2017 | ............. | F03G 7/065 |
| GB | 2072756 A | * 10/1981 | ............. | F03G 7/065 |
| JP | 57119180 A | * 7/1982 | ............. | F03G 7/065 |
| WO | WO-2011141183 A2 | 11/2011 | | |
| WO | WO-2012113398 A1 | 8/2012 | | |

OTHER PUBLICATIONS

European Search Report for Application No. 14173152.1-1608 dated Aug. 28, 2015.

* cited by examiner

*Primary Examiner* — Laert Dounis
(74) *Attorney, Agent, or Firm* — Locke Lord LLP; Scott D. Wofsy; Joshua L. Jones

(57) ABSTRACT

An actuator includes a drum defining a longitudinal axis and having axially opposed first and second end portions that are rotatable relative to one another about the longitudinal axis. A shape memory element is wrapped around the drum and extends from the first end portion of the drum to the second end portion of the drum to actuate relative rotation of the first and second end portions of the drum about the longitudinal axis by activation of the shape memory element.

5 Claims, 2 Drawing Sheets

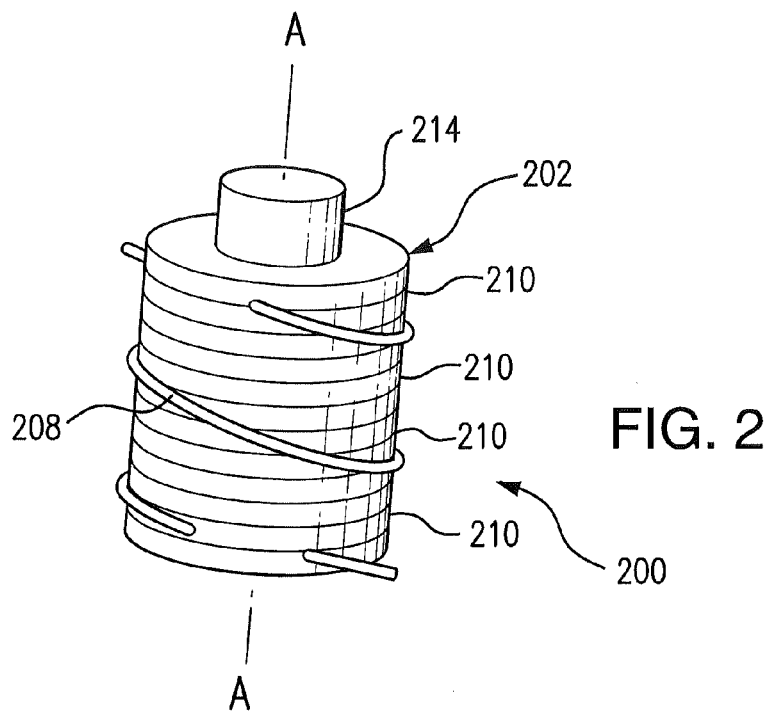
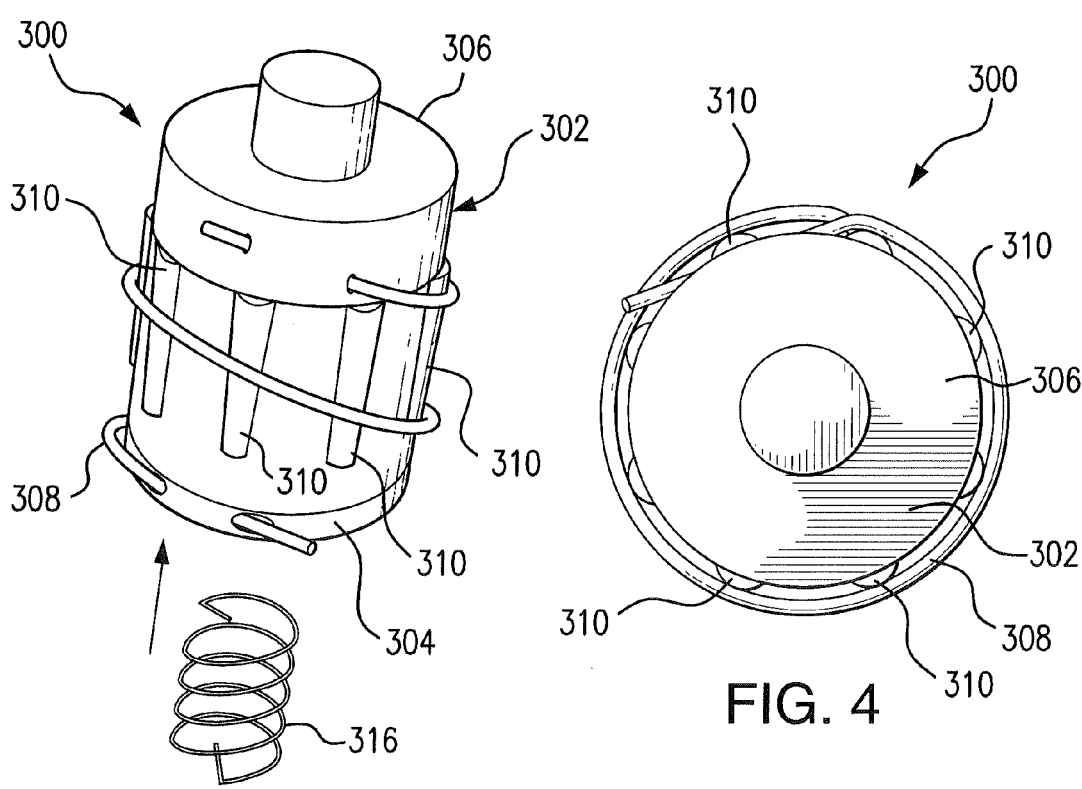

ROTATIONAL ACTUATORS

BACKGROUND OF THE INVENTION

1. Field of the Invention

The present invention relates to actuation, and more particularly to rotational actuation, for example to turn a shaft about its axis.

2. Description of Related Art

A variety of devices are known for actuation. For example, servos, stepper motors, hydraulic or pneumatic pistons, and associated linkages and gears can be used to provide actuation for rotating, pivoting, sliding, and the like. A typical servo, for example, includes a motor, a gear reduction system, and sensors with associated circuitry for feedback control of the motor.

As there is pressure to make products smaller and less expensive, there is an ever present desire to make actuators more simple, compact, and at lower cost. The aerospace industry is one example where size, cost, and complexity are very important. One exemplary actuator, disclosed in U.S. Pat. No. 4,761,955 to Bloch, which is incorporated herein by reference in its entirety, uses a shape memory alloy wire wound through six sets of pulleys of a rotary accumulator as the basis for an actuator.

Such conventional methods and systems have generally been considered satisfactory for their intended purpose. However, there is still a need in the art for actuators that allow for improved simplicity, size, cost, and the like. There also remains a need in the art for such actuators that are easy to make and use. The present invention provides a solution for these problems.

SUMMARY OF THE INVENTION

A new and useful actuator includes a drum defining a longitudinal axis and having axially opposed first and second end portions, e.g., grounded and actuated end portions, respectively, that are rotatable relative to one another about the longitudinal axis. A shape memory element is wrapped around the drum and extends from the first end portion of the drum to the second end portion of the drum to actuate relative rotation of the first and second end portions of the drum about the longitudinal axis by activation of the shape memory element.

The drum can be configured and adapted to provide proportionally greater travel in a direction along the longitudinal axis for the shape memory element as the shape memory element is actuated around the drum. For example, in certain embodiments, the first and second end portions of the drum can be connected to one another by a torsionally flexible drum portion. The flexible drum portion can include a composite material that provides for a torsionally compliant, radially rigid drum portion. The torsional flexibility of the drum can be chosen by material selection and by the presence of cutouts or slots in the drum. The flexible drum portion is annular with slots as required defined therethrough, wherein the slots are aligned in a generally axial direction to lower the torsional rigidity of the drum. Each slot is defined between respective axial strips of the annular flexible drum portion. The strips are configured and adapted to flex progressively in the angular (torsion) direction between the first and second end portions of the drum under force of the shape memory element when activated and to resiliently bias against the shape memory element to return the drum to a relaxed state when the shape memory element is deactivated. The drum can include a stop to provide bias torque in the drum for reverse actuation of the drum with the shape memory element deactivated. The strips can advantageously be stiff in the radial direction to resist the constricting force of the wound shape memory element.

In accordance with certain embodiments, the drum includes a plurality of discs axially stacked, wherein each disc is free to rotate independently around the longitudinal axis. A torsion spring can operatively connect the first and second end portions of the drum to bias against the shape memory element to return the drum to an original condition upon deactivation of the shape memory element.

It is also contemplated that the drum can include a plurality of tapered rollers circumferentially spaced apart about the longitudinal axis, wherein each tapered roller has an reduced diameter end proximate the first end portion of the drum and an opposed enlarged diameter end proximate the second end portion of the drum. The shape memory element can define a polygonal path winding around the tapered rollers. The second end portion of the drum can include a splined output flange, or any attachment arrangement suitable for the transmission of the rotational torque and motion.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art will readily understand how to make and use the devices and methods of the subject disclosure without undue experimentation, preferred embodiments thereof will be described in detail herein below with reference to certain figures, wherein:

FIG. 2 is a schematic perspective view of another exemplary embodiment of an actuator, showing a drum that includes a stack of rotating discs;

FIG. 3 is a schematic perspective view of another exemplary embodiment of an actuator, showing a drum with tapered rollers; and FIG. 4 is a schematic end view of the actuator of FIG. 3, showing the polygonal wrapping of the shape memory element about the tapered rollers.

DETAILED DESCRIPTION OF THE PREFERRED EMBODIMENTS

Figure 1:
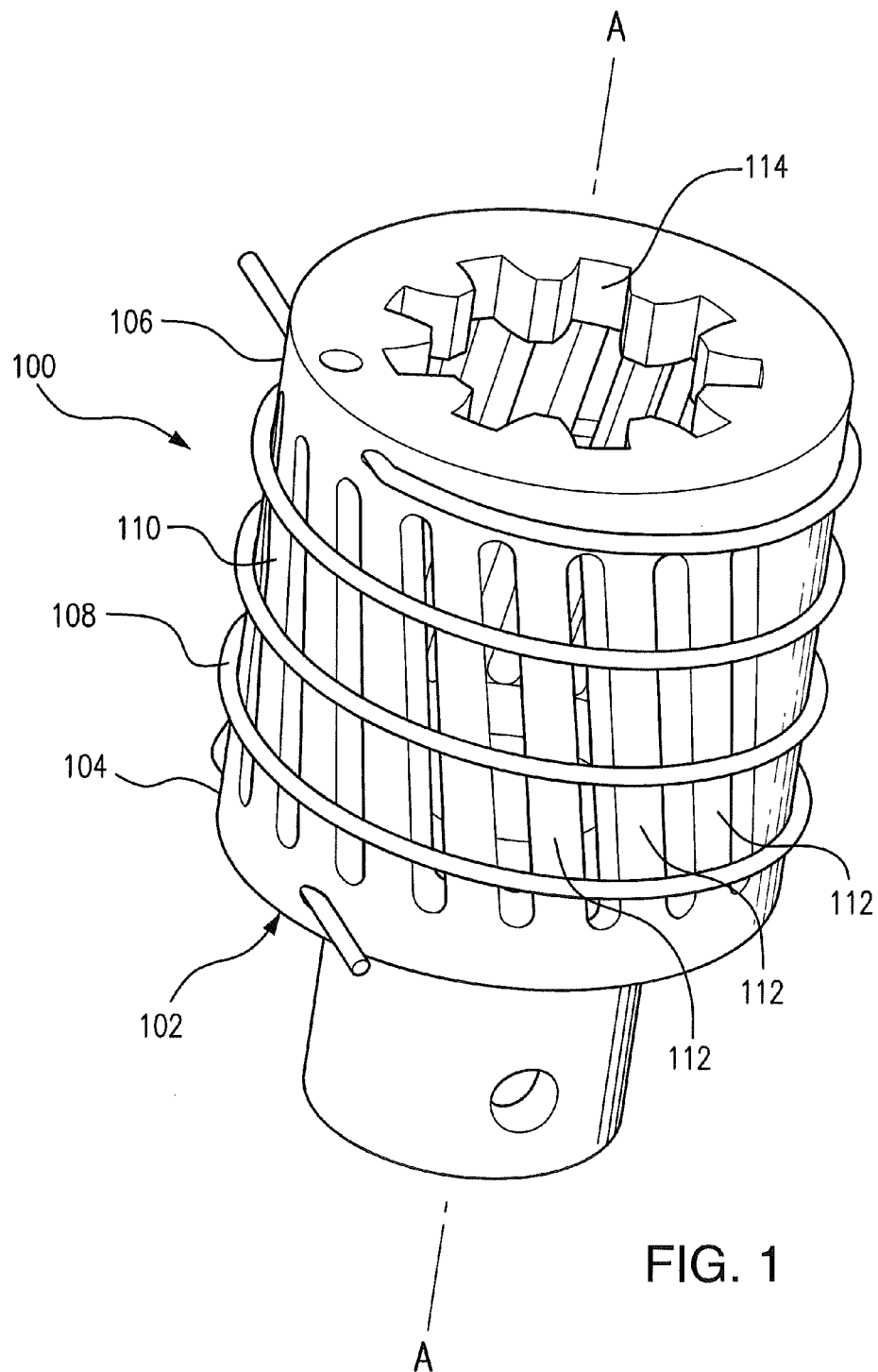
FIG. 1 is a schematic perspective view of an exemplary embodiment of an actuator, showing the shape memory element wrapping around the flexible annular drum portion.

Reference will now be made to the drawings wherein like reference numerals identify similar structural features or aspects of the subject invention. For purposes of explanation and illustration, and not limitation, a partial view of an exemplary embodiment of an actuator in is shown in FIG. 1 and is designated generally by reference character 100. Other embodiments of actuators, or aspects thereof, are provided in FIGS. 2-4, as will be described. The systems described herein can be used to provide rotational actuation, for example oscillatory actuation about the axis of a shaft.

Actuator 100 includes a drum 102 defining a longitudinal axis A and having a first end portion 104 axially opposed to a second end portion 106. End portions 104 and 106 are rotatable relative to one another about the longitudinal axis A. A shape memory element 108 is wrapped around drum 102 and extends from first end portion 104 to second end portion 106. This allows element 108 to actuate or drive relative rotation of the first and second end portions 104 and 106 about longitudinal axis A by activation of the shape memory element 108. Element 108 can be of any suitable shape memory alloy or material such as Nitinol, and can be activated, for example by applying a voltage across its respective ends to provide heat for the shape memory effect shortening element 108.

With continued reference to FIG. 1, first and second end portions 104 and 106 are connected to one another by a flexible annular drum portion 110. In this embodiment, portion 110 has slots defined therethrough, wherein the slots are aligned in a generally axial direction. Some obliqueness in the slots relative to the axial direction may be desirable in the relaxed state for certain applications to counteract axial shortening of the drum that can occur during actuation. Each slot is defined between respective axial strips 112 of portion 110. The strips 112 are configured and adapted to flex progressively between the first and second end portions 104 and 106 under force of the shape memory element 108 when activated. In their flexed state, strips 112 resiliently bias against the shape memory element 108, and can return toward a relaxed state when the shape memory element 108 deactivated. The strips 112 are configured to provide a sufficient return torque to restretch element 108 and provide any extra torque needed to provide actuation torque in the return direction. Some remaining bias can be expected to match the yield strength of the element 108. Even more bias can be included so there is useable torque available at the (return) end of travel—in this case the actuator could include a rotation stop, so this remaining torsional bias does not continue to stretch element 108 beyond its design limits. Thus activating and deactivating element 108, e.g., by switching an electrical current through element 108 on and off, can actuate drum 102 back and forth around axis A. End portion 106 includes a splined output flange 114.

The actuation of the element 108 shortens the wrapped element 108 and would simply constrict or radial squeeze the drum, however if the drum is sufficiently rigid to resist this radial squeezing, then the secondary effect is an induced twisting of the second end of the drum relative to the first end. The twisting effect is the intended and desirable result of this configuration. Drum 100 can be made of a composite material that provides for a torsionally complaint, radially rigid drum portion. It should be noted that the tangential location of any portion of element 108 moves progressively more the farther it is from the grounded end of the actuator drum. The embodiments described herein afford a means for the progressively greater tangential motion of the shape memory element along the length and circumference of the drum.

Drum 100 is configured and adapted to provide proportionally greater travel in a direction along the longitudinal axis for element 108 as element 108 is actuated around drum 100, e.g., to reduce relative motion locally between drum 100 and element 108. This can also be accomplished in other ways. For example, with reference now to FIG. 2, actuator 200 includes a drum 202 that includes a plurality of discs 210 that are axially stacked. Each disc 210 is free to rotate independently around the longitudinal axis A. This relative rotation can be accomplished by connecting each disc 210 to shaft 214 with a respective bearing, bushing, or the like. A shape memory element 208, similar to element 108 described above, wraps around drum 202 to actuate relative rotation of the first and second end portions of drum 202.

With reference now to FIGS. 3-4, actuator 300 has a drum 302 that includes a plurality of tapered rollers 310 circumferentially spaced apart about the longitudinal axis A. Each tapered roller 310 has its reduced diameter end proximate the first end portion 304 of drum 302 and its opposed enlarged diameter end proximate second end portion 306. Shape memory element 308 defines a polygonal path winding around tapered rollers 310, as shown in FIG. 4. A torsion spring 316 is mounted inside drum 302, as indicated schematically in FIG. 3, to connect the first and second end portions of drum 302 to bias against element 308 to return drum 302 to its original condition upon deactivation of element 308, much as described above with respect to the resilient strips 110 in FIG. 1. One end portion 306 rotates relative to the rest of drum 302, and element 308 and spring 316 are mounted to rotate end portion 306 relative to the rest of drum 302.

The exemplary actuator embodiments described above all include means for accommodating progressive movement of the shape memory element along the respective drum. For example, if a shape memory element such as Nitinol is used, it can be pre-stretched. When activated by applying a voltage across the element, it will shrink by about 10% in length. If one end of the drum is held stationary, the opposite end will experience full motion, but the intermediate portions of the drum will undergo propositionally less motion, to match the motion of the shape memory element as it grows and shrinks. This reduces friction or binding between the surface of the drum and the shape memory element.

FIG. 1 shows element 108 having four coils around drum 102. Those skilled in the art will readily appreciate that this is only exemplary. Greater numbers of coils in the shape memory element will result in greater angular movement of the actuator. So actuators can be designed for specific applications with any suitable number of coils to achieve the desired angular travel.

While shown and described in the exemplary context of having the shape memory element wrapped around the outside of the drum, those skilled in the art will readily appreciate that the shape memory element can readily be wrapped around within the drum or inside of the drum, if suitably retained, without departing from the scope of this disclosure. Additionally, while shown and described in the exemplary context of having a single wire, constant diameter type shape memory element, those skilled in the art will readily appreciate that multiple shape memory elements, multi-stranded elements, and non-constant cross-sectional elements can all be tailored to provide a specific torque for a given application without departing from the scope of this disclosure. The response time of the actuators described herein can be increased by enhancing the heat transfer to the shape memory elements.

The methods and systems, as described above and shown in the drawings, provide for actuators with superior properties including for example, simplicity, size, cost, and the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. An actuator comprising:
a drum defining a longitudinal axis and having axially opposed first and second end portions that are rotatable relative to one another about the longitudinal axis; and
a shape memory element wrapped around the drum and around the longitudinal axis and extending from the first end portion of the drum to the second end portion of the drum to actuate relative rotation of the first and second end portions of the drum about the longitudinal axis by activation of the shape memory element;

wherein the drum includes a plurality of discs including at least three discs axially stacked along the longitudinal axis, the at least three discs being free to rotate independently from one another around the longitudinal axis.

2. The actuator of claim 1, wherein the plurality of discs and the shape memory element are coaxial about the longitudinal axis.

3. The actuator of claim 1, wherein each of the plurality of discs is operatively connected to a shaft for independent rotation.

4. The actuator of claim 3, wherein each disc is connected to the shaft by one of a bearing and a bushing.

5. The actuator of claim 1, wherein the shape memory element wraps around the drum and longitudinal axis along a helix, wherein the helix, the drum, and the at least three discs of the drum are all coaxial with one another about the longitudinal axis.

* * * * *